United States Patent
Thomas (10) Patent No.: US 10,399,502 B2
(45) Date of Patent: Sep. 3, 2019

(54) BIN FOR A VEHICLE CONSOLE HAVING ORTHOGONALLY POSITIONED WALLS ATTACHED AT LIVING HINGES

(71) Applicant: Ford Global Technologies, LLC, Dearborn, MI (US)

(72) Inventor: Gregory Thomas, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/865,470

(22) Filed: Jan. 9, 2018

(65) Prior Publication Data

US 2019/0210536 A1 Jul. 11, 2019

(51) Int. Cl.
| | |
|---|---|
| *B60R 7/04* | (2006.01) |
| *B60R 11/00* | (2006.01) |
| *B65D 21/02* | (2006.01) |
| *B65D 5/20* | (2006.01) |
| *B29C 45/00* | (2006.01) |
| *B29L 7/00* | (2006.01) |
| *B29L 31/22* | (2006.01) |

(52) U.S. Cl.
CPC ............ *B60R 7/04* (2013.01); *B29C 45/0081* (2013.01); *B60R 11/00* (2013.01); *B65D 5/2066* (2013.01); *B65D 21/0202* (2013.01); *B29C 2045/0093* (2013.01); *B29L 2007/00* (2013.01); *B29L 2031/22* (2013.01); *B60R 2011/0007* (2013.01); *B60R 2011/0052* (2013.01); *B60R 2011/0059* (2013.01)

(58) Field of Classification Search
CPC ........... B60R 7/04; B60R 7/043; B60R 7/046; B60R 7/06; B60R 2011/0007; B60R 2013/01; B60R 13/01; B60R 13/011; B60R 13/013
USPC ....... 296/24.34, 37.8; 220/6, 7, 62; 224/404, 224/432; 312/259, 258, 257.1
See application file for complete search history.

(56) References Cited

U.S. PATENT DOCUMENTS

| | | | |
|---|---|---|---|
| 5,795,005 A * | 8/1998 | Garfias ................... | B60R 7/046 220/9.2 |
| 6,719,347 B2 | 4/2004 | Gehring et al. | |
| 6,918,502 B1 | 7/2005 | Overholt et al. | |
| 7,201,421 B2 | 4/2007 | Reynolds et al. | |
| 7,562,931 B2 | 7/2009 | Stojanovic | |
| 8,616,605 B2 | 12/2013 | Hipshier et al. | |
| 8,651,309 B2 | 2/2014 | Gualersi et al. | |
| 8,651,593 B2 * | 2/2014 | Bezich ............... | A47B 87/0292 312/259 |
| 8,714,617 B2 * | 5/2014 | Hipshier ................... | B60R 7/04 296/24.34 |
| 9,132,785 B2 * | 9/2015 | Roach ..................... | B60R 9/065 |
| 2006/0085940 A1 * | 4/2006 | Chernoff .................. | A47L 5/24 15/313 |

(Continued)

FOREIGN PATENT DOCUMENTS

EP  0864466  9/1998

*Primary Examiner* — Dennis H Pedder
(74) *Attorney, Agent, or Firm* — Vichit Chea; Price Heneveld LLP (57) ABSTRACT

A vehicle console includes a housing having an interior volume. A console bin is disposed within the interior volume. The console bin is an injection molded member having a base and a plurality of bin walls coupled to the base at living hinges, wherein the plurality of bin walls form an interior surface that extends orthogonally from the base.

6 Claims, 11 Drawing Sheets

(56) References Cited

U.S. PATENT DOCUMENTS

2016/0059790 A1\* 3/2016 Perelli ...................... B60R 7/04
　　　　　　　　　　　　　　　　　　　　　　　　224/486

\* cited by examiner

BIN FOR A VEHICLE CONSOLE HAVING ORTHOGONALLY POSITIONED WALLS ATTACHED AT LIVING HINGES

FIELD OF THE INVENTION

The present invention generally relates to vehicle storage compartments, and more specifically, a bin for a vehicle console that is molded to include independently operable walls that are connected at living hinges to a base.

BACKGROUND OF THE INVENTION

Within various vehicles, a center console is positioned between the driver's seat and the front passenger seat. This center console typically includes various storage receptacles and containers that are contained within the console assembly. These various storage areas can be accessed through an operable door or lid that is incorporated within the console. Various interior containers within the console can be removed as desired by the user for cleaning and/or replacement.

SUMMARY OF THE INVENTION

According to one aspect of the present invention, a vehicle console includes a housing having an interior volume. A console bin is disposed within the interior volume. The console bin is an injection molded member having a base and a plurality of bin walls coupled to the base at living hinges, wherein the plurality of bin walls form an interior surface that extends orthogonally from the base.

Embodiments of this aspect of the invention can include any one or combination of the following features:
- the plurality of bin walls are rotationally operable relative to the base from a planar position defined by the plurality of bin walls being co-planar with the base, to a container position defined by the plurality of bin walls being rotated upward to a position orthogonal to the base
- the plurality of bin walls are retained in the container position by fasteners installed at vertical seams defined between the plurality of bin walls
- the console bin is molded in the planar position
- outer edges of the plurality of bin walls includes connecting edges that connect to an upper perimeter of the housing
- the base is secured to a lower member of the housing via fasteners
- at least one of the connecting edges includes a clip member that forms an interference engagement with the housing
- a lid that selectively encloses the interior volume
- a clip member formed within one of the connecting edges of the plurality of bin walls
- the clip member selectively engages a latch of the lid to define a closed position of the lid According to another aspect of the present invention, a vehicle includes a center console disposed within a passenger cabin. A bin is disposed within the console. The bin includes a plurality of walls that are coupled to a base at respective living hinges. Each wall of the plurality of walls is selectively operable from a planar position, co-planar with the base, to a container position perpendicular to the base and defining a vertical interior surface of the bin.

Embodiments of this aspect of the invention can include any one or combination of the following features:
- the bin is an injection molded member that is molded to include the respective living hinges and the plurality of walls in the planar position
- upper edges of the plurality of walls in the container position include connecting edges that connect to an upper perimeter of the center console
- a lid that selectively encloses an interior volume of the center console, wherein the bin is disposed within the interior volume
- a clip member formed within one of the connecting edges of the plurality of walls
- the clip member selectively engages a latch of the lid to define a closed position of the lid According to another aspect of the present invention, a method for forming a vehicle console includes injection molding a console bin in a planar position. The console bin includes walls attached to a base at living hinges. The method also includes folding the walls from the planar position, co-planar with the base, to a container position, wherein the walls are perpendicular to the base. The method also includes attaching the console bin in the container position to a console housing.

Embodiments of this aspect of the invention can include any one or combination of the following features:
- the step of injection molding the console bin includes injecting a formable material into a mold having top and bottom members that define a molding cavity in a molding position, wherein the molding cavity defines a shape of the console bin in the planar position
- the bottom member of the mold includes at least one lifter, wherein vertical operation of the lifter within the bottom member corresponds to contemporaneous lateral operation of the lifter relative to the top member
- at least one lifter is configured to form a clip member defined within a connecting edge of a latch wall of the walls for the console bin, wherein the clip member selectively engages a latch of a lid for the console housing to define a closed position of the lid.
- the mold is operable from the molding position, wherein the top member engages the bottom member and the at least one lifter is in a retracted position, to a release position, wherein the top member moves away from the bottom member, and to a removal position, wherein the at least one lifter operates from the retracted position to an extended position
- operation of the at least one lifter between the retracted position and the extended position defines a slidable operation of the at least one lifter through a lifter slot defined within the bottom member
- the at least one lifter includes a head portion, wherein the head portion in the retracted position is disposed within a lifter recess defined within the bottom member
- the extended position is defined by the head portion of the at least one lifter extending from the lifter recess at a lifter angle
- operation of the at least one lifter at the angle defines the contemporaneous vertical and lateral operation of the at least one lifter with respect to the top member These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
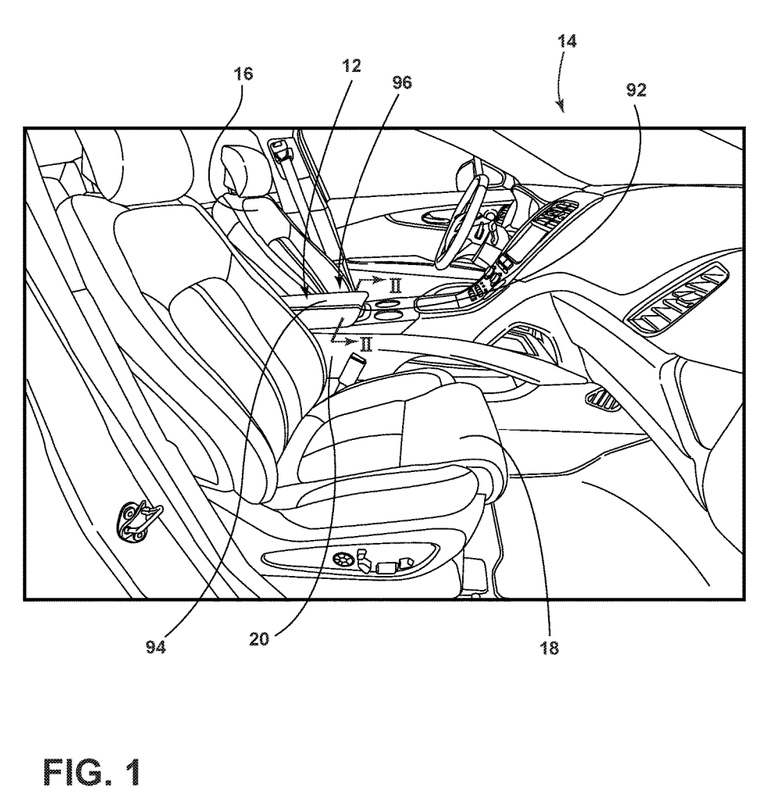
FIG. 1 is a perspective view of a passenger compartment of a vehicle that includes a center console having an aspect of the console bin contained therein.
Figure 2:
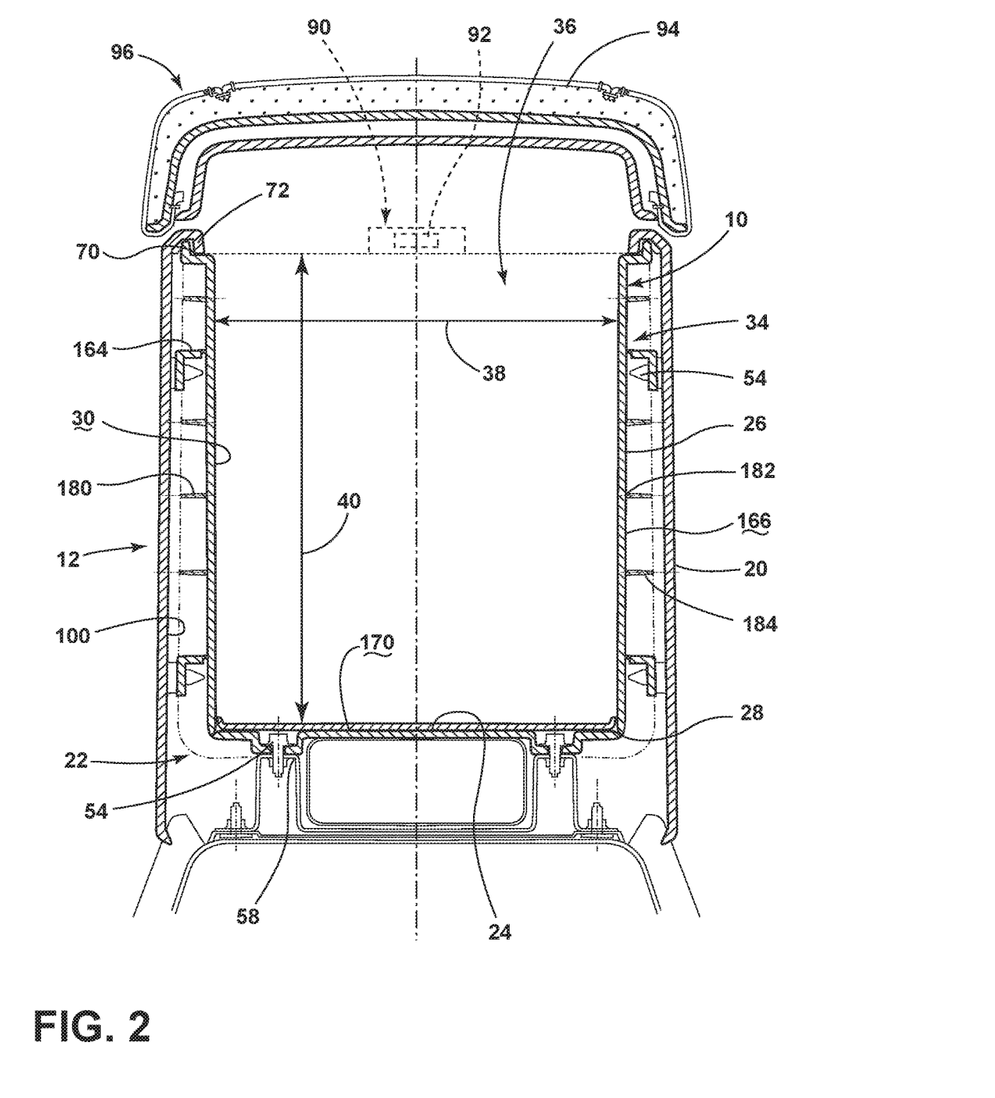
FIG. 2 is a cross-sectional view of the console of FIG. 1 taken along line II-II.
Figure 3:
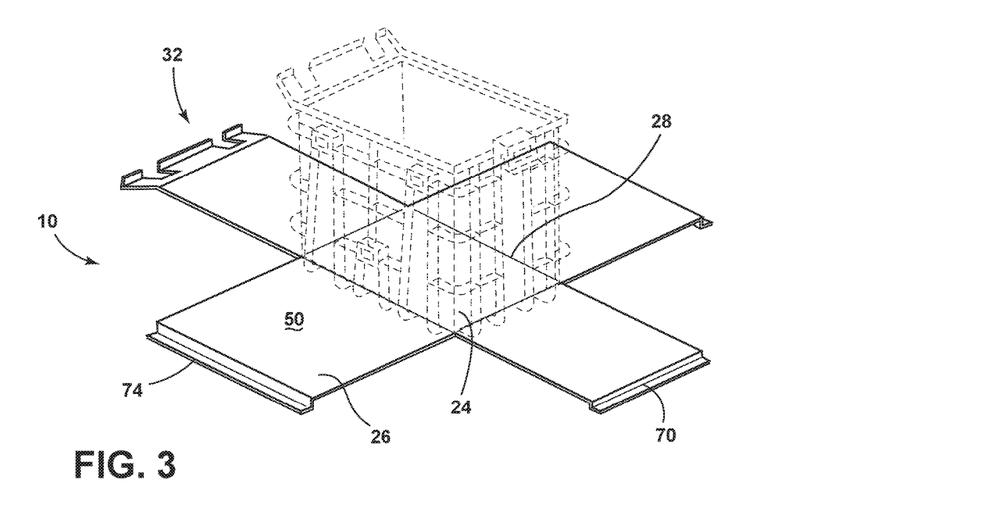
FIG. 3 is a partially exploded view of the console bin of FIG. 2 shown in a planar position.
Figure 4:
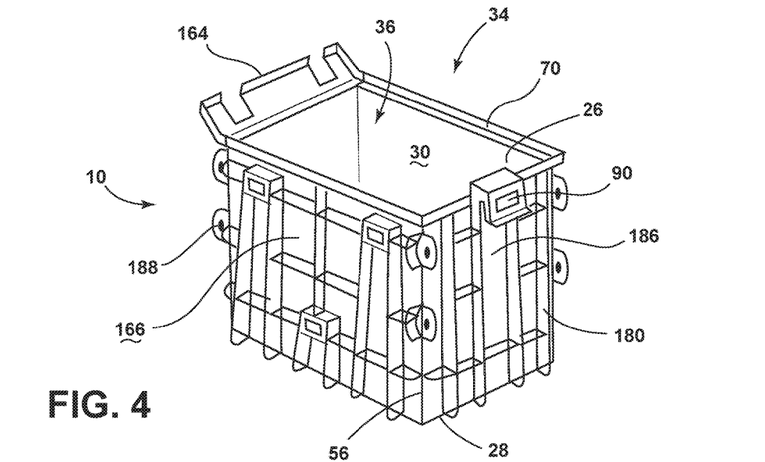
FIG. 4 is a perspective view of the console bin of FIG. 3 shown in the container position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-4 and 8-12, reference numeral 10 generally refers to a bin that is disposed within a console 12 for a vehicle 14, where the console 12 is typically in the form of a center console 12 disposed between the driver's seat 16 and the front passenger seat 18. According to various aspects of the device, the console 12 for the vehicle 14 can include a housing 20 having an interior volume 22. A bin 10 for the console 12 is disposed within the interior volume 22.

The bin 10 can be an injected molded member having a base 24 and a plurality of bin walls 26 that are coupled to the base 24 at living hinges 28. The plurality of bin walls 26 form an interior surface 30 that extends orthogonally from the base 24. The plurality of bin walls 26 are rotationally operable relative to the base 24 from a planar position 32. The planar position 32 is defined by the plurality of bin walls 26 being coplanar, or substantially coplanar, with the base 24. The plurality of bin walls 26 are rotatable about the living hinges 28 to a container position 34 that is defined by the plurality of bin walls 26 being rotated upward to a vertical position extending orthogonal to the base 24. By extending orthogonally from the base 24, the plurality of bin walls 26 are set at 90° with respect to the base 24 and extend vertically from the base 24. Accordingly, the inner volume 36 of the console bin 10 has a substantially consistent width 38 throughout the height 40 of the bin 10 for the console 12.

Referring again to FIGS. 2-4 and 8-12, the bin 10 for the console 12 is typically a molded member that is molded in the planar position 32. In this manner, the surface that ultimately forms the interior surface 30 of the bin 10 defines a substantially consistent planar surface 50 as it is formed within the mold 52 for the bin 10. Additionally, the living hinges 28 that are defined between the bin walls 26 and the base 24 for the bin 10 are formed during this molding process. Types of molding processes that can be used to form the bin 10 can include, but are not limited to, injection molding, compression molding, blow molding, combinations thereof, and other similar forms of molding techniques. After the bin 10 in the planar position 32 is formed, the bin 10 can be removed from the mold 52 and the bin walls 26 rotated upward from the planar position 32 to define a container position 34. In this container position 34, the plurality of bin walls 26 are retained by fasteners 54 installed at vertical seams 56 that are defined between adjacent walls of the plurality of bin walls 26 for the bin 10. The base 24 for the bin 10 is secured to a lower member 58 of the housing 20 for the console 12 via fasteners 54.

Referring again to FIGS. 1-4 and 8-12, edges of the plurality of bin walls 26 can include connecting edges 70. These connecting edges 70, when placed in the container position 34, are configured to connect to an upper perimeter 72 of the housing 20. The connecting edges 70, when the bin 10 is in the planar position 32, are situated as outer edges 74 of the various bin walls 26. In order to form the various edges that ultimately become upper connecting edges 70 of the plurality of bin walls 26 in the container position 34, the mold 52 may include various lifters 76 that operate within a portion of the mold 52. These lifters 76 within the mold 52 can serve to form the connecting edges 70 of each of the bin walls 26 and also serve to assist in separating the bin 10 from the mold 52 while the bin 10 is in the planar position 32. The configuration of the lifters 76 and other portions of the mold 52 will be discussed more fully below. In various aspects of the device, the mold 52 may not include lifters and the molded bin 10 in the planar position 32 can be removed from the mold 52 by hand or with the use of a vertical ejection mechanism disposed within the mold 52.

As exemplified in FIGS. 1-4 and 8-12, the upper connecting edges 70 of the bin walls 26 that form the bin 10 for the console 12 can include a clip member 90 that forms an interference engagement with the housing 20. This clip member 90 can be formed within one of the connecting edges 70 for the plurality of bin walls 26. Additionally, this clip member 90 can selectively engage a latch 92 of a lid 94 that selectively encloses the interior volume 22 to define a closed position 96 of the lid 94. This clip member 90 can be formed by various undulating and angled surfaces that may be formed using the lifters 76 included within the mold 52 for forming the bin 10.

According to the various aspects of the device, the bin walls 26 can be held in place in the container position 34 by fasteners 54. The bin walls 26 can also be held in place by the inner walls 100 of the housing 20 or the console 12. In such an embodiment, when the bin 10 is placed within the housing 20, the engagement between the upper connecting edges 70 of the bin walls 26 for the bin 10 with the upper perimeter 72 of the housing 20 positions the bin walls 26 in the orthogonal arrangement with respect to the base 24. The base 24 can then be attached to a lower member 58 of the housing 20 to secure the bin 10 within the housing 20. It is also contemplated that the bin 10 can be selectively removable from the housing 20 for cleaning and/or replacement. When removed from the housing 20, various aspects of the bin 10 can allow for the plurality of bin walls 26 to be independently operable about the respective living hinges 28. In this manner, when removed from the housing 20, each of the bin walls 26 can be independently and separately rotated about a respective living hinge 28. Through this configuration, the console bin 10 can be repeatedly moved between the planar position 32 and the container position 34. By allowing the bin 10 to be placed in the planar position 32, effective storage of multiple bins 10 can be conveniently accomplished such as within a dealership, parts supplier, manufacturer, or other similar manufacturing, assembly or after-market setting.

Figure 5:
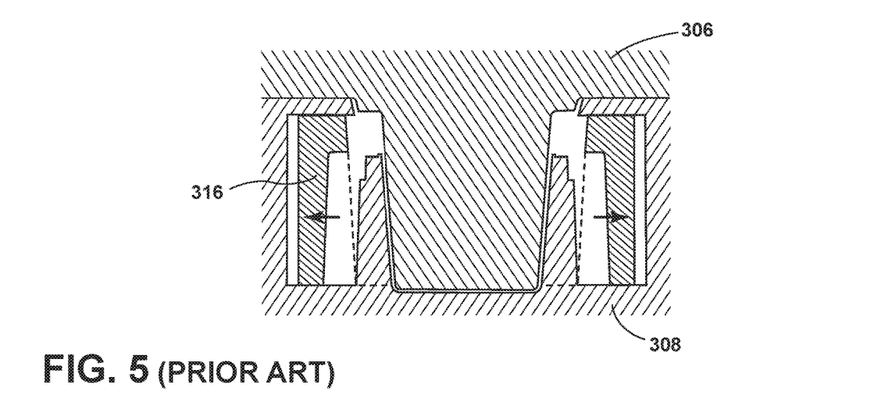
FIG. 5 is a schematic cross-sectional view of a prior art mold for forming the prior art console bin.
Figure 6:
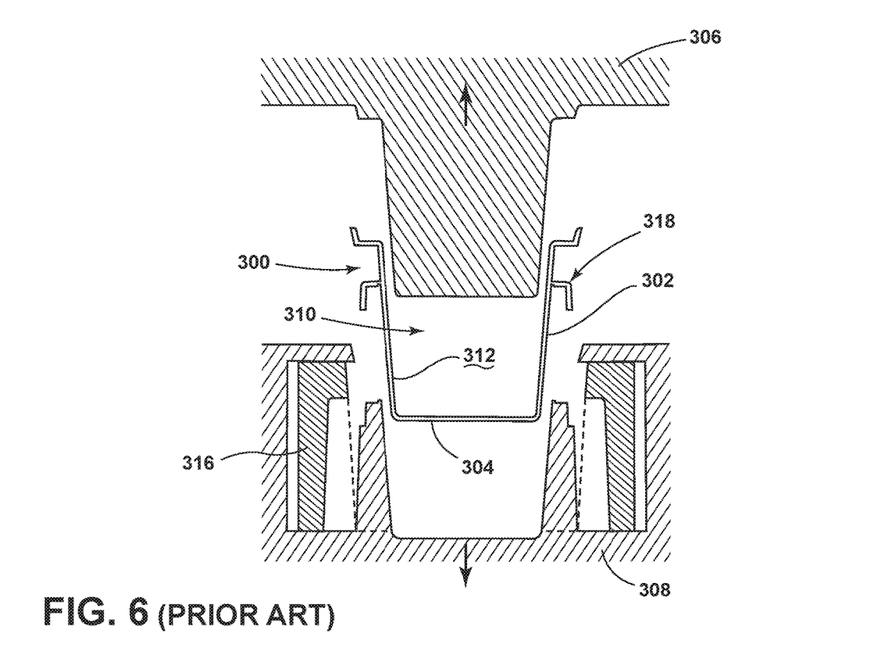
FIG. 6 is a schematic cross-sectional view of the prior art mold of FIG. 5 showing separation of the prior art console bin from the prior art mold.
Figure 7:
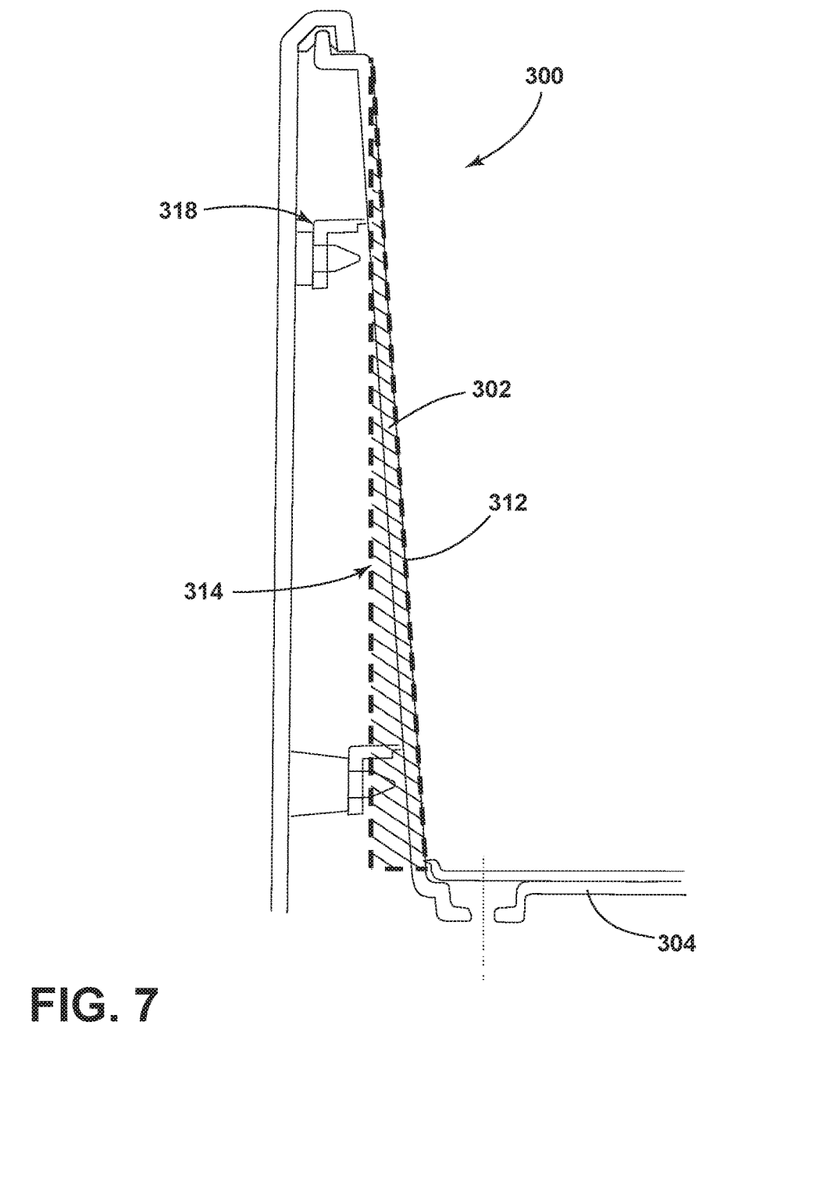
FIG. 7 is a schematic cross-sectional view of a prior art cross-sectional bin and illustrating the result of sloped walls used within the prior art console bins.

In various prior art containers 300 used within consoles 12 for vehicles 14, as exemplified in FIGS. 5-7, these containers 300 are typically configured to have angled walls 302 that extend upward from a bottom panel 304. The use of these angled walls 302 is typically the result of the injection-molding process where the obliquely angled walls 302 are formed as a result of the shape of the upper and lower molds 306, 308, as exemplified in the prior art images of FIGS. 5 and 6. For the upper mold 306 to be removed from the interior 310 of the prior art container 300, the prior art container 300 typically requires an obliquely angled interior surface 312. In this prior art configuration of the container 300 for various vehicle consoles 12, the container 300 is formed as a single integral piece that is rigidly formed with the angled walls 302 set in a fixed position with respect to the bottom panel 304. This configuration can also support nesting or stacking of the containers 300 on top of one another. The limitation of these prior art containers 300 is found in the amount of space 314 available within the interior 310 of each container 300. As exemplified in the schematic diagram of FIG. 7, the configuration of the obliquely angled walls 302 for the prior art container 300 is shown. The hatched area overlaying this image shows the amount of space 314 that is unused as a result of the obliquely angled walls 302 for the prior art container 300. Utilizing vertical walls, as exemplified in the device disclosed herein, adds a significant amount of additional space 314 is typically within the interior volume 22. Moreover, with the obliquely angled walls 302 of the prior art container 300, greater amounts of space 314 is typically present between the container 300 and the housing 20 for the console 12 that remains substantially unused.

Referring again to FIGS. 5 and 6 exemplifying the prior art containers 300, the upper and lower molds 306, 308 used to create the prior art containers 300 can include complex molding that requires the use of both laterally and vertically sliding elements 316 that must operate according to a particular sequence to achieve the various attachment surfaces 318 included within the prior art container 300. These complex molds can be very large and may take up significant amounts of room within a facility. The complex molds can also require extensive maintenance and repair due to the number of moving parts included within these prior art molds. Also, to achieve the attachment surfaces 318 contained within the prior art containers 300, laterally moving sliding elements 316 of the prior art molds must be included within each of the four sides of the container 300 for achieving attachment surfaces 318 along each edge of the prior art container 300. Again, these prior art molds used for forming the containers 300 can be significantly complex machines that can require excessive maintenance and repair over the life of the prior art mold.

Referring now to FIGS. 8-13, having described various aspects of the bin 10 included within a console 12 for a vehicle 14, a method 400 is disclosed for forming a console 12 for a vehicle 14. According to the method 400, step 402 includes injection molding a bin 10 in a planar position 32. As discussed previously, the bin 10 for the console 12 includes bin walls 26 that are attached to the base 24 at respective living hinges 28. The step 402 of injection molding the bin 10 includes injecting a formable material 114 into a mold 52 having top and bottom members 106, 108 that define a molding cavity 110 when the top and bottom members 106, 108 are placed in a molding position 112. The molding cavity 110 defines the shape of the bin 10 in the planar position 32, including the form and structure of the living hinges 28. The planar position 32 is defined by the bin walls 26 and the base 24 being coplanar such that the bin walls 26 and the base 24 of the bin 10 define a substantially flat, planar structure. In various aspects of the device, the bottom member 108 of the mold 52 may include at least one lifter 76. Vertical operation 116 of the lifter 76 within the bottom member 108 is configured to correspond to contemporaneous or simultaneous lateral operation 118 of the lifter 76 relative to the top member 106. Various aspects of the device may include a mold 52 that includes an ejection mechanism for removing the molded bin 10 from the mold 52. Such an ejection mechanism may include vertical members 122 that operate vertically with respect to the mold 52.

Figure 8:
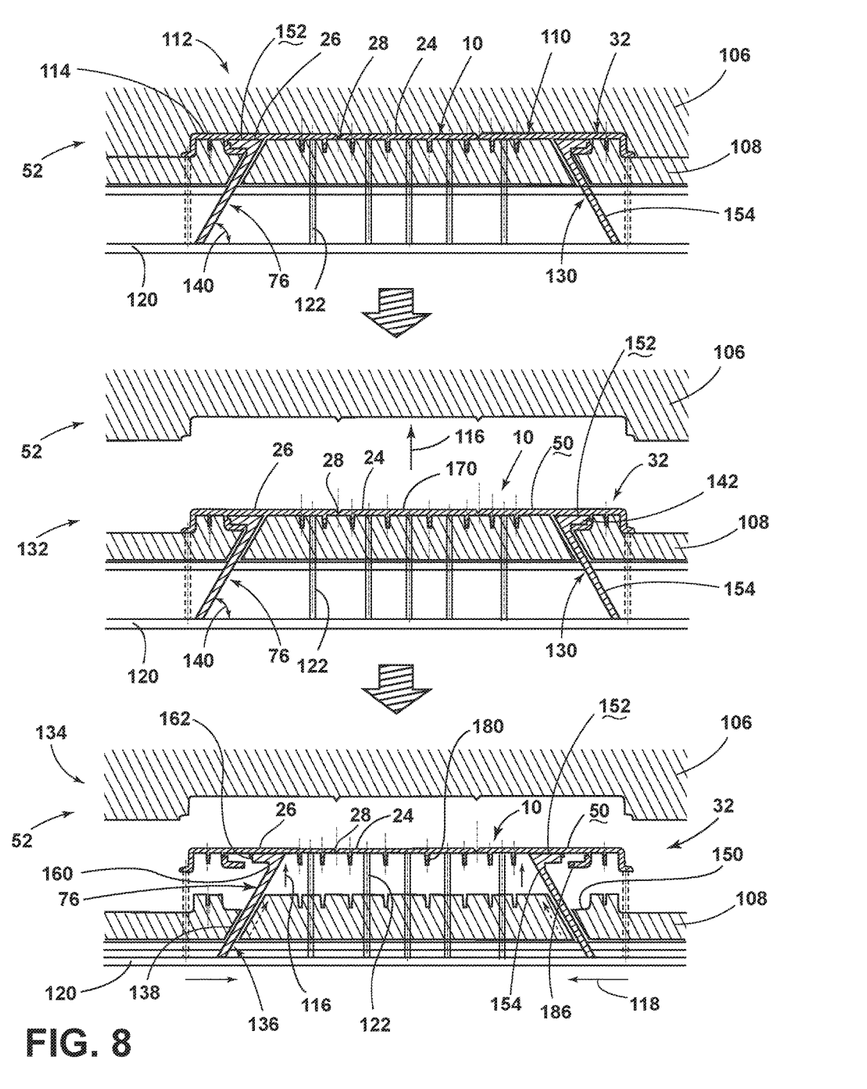
FIG. 8 is a cross-sectional view of a mold for forming an aspect of the console bin formed in a planar position and showing a progression of steps used in forming the console bin.
Figure 9:
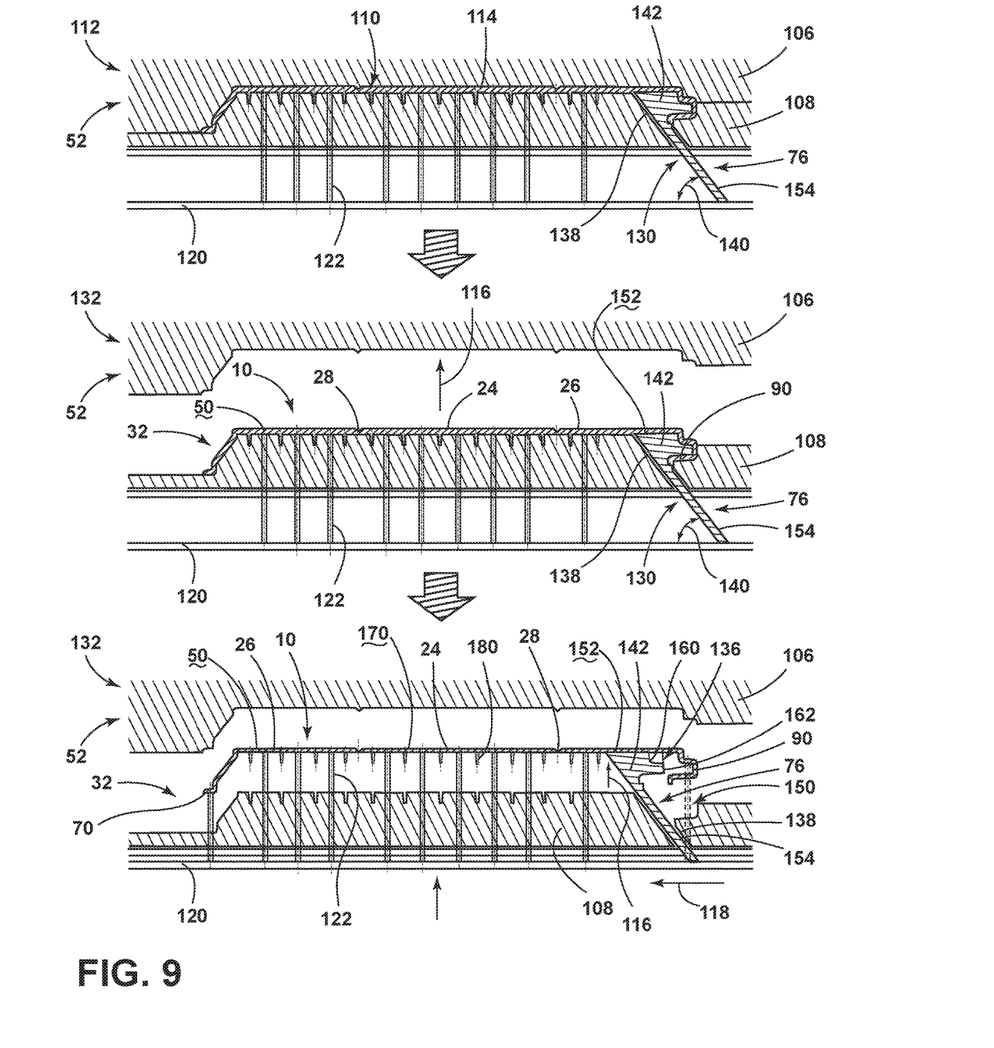
FIG. 9 is a second cross-sectional view of the mold of FIG. 8 showing the progression of the process used to form the console bin in the planar position.

As exemplified in FIGS. 8 and 9, the lifters 76 can be slidably attached to a plate 120. A plurality of stationary vertical members 122 can extend upward from the plate 120. The stationary vertical members 122 move with the plate 120 in a vertical direction to at least partially eject the bin 10 from the mold 52. The stationary vertical members 122 can extend vertically through the bottom member 108 and may not experience any lateral operation 118. The laterally operable lifters 76 can be slidably operable along the plate 120. As the plate 120 undergoes the vertical operation 116 toward the bottom member 108, the laterally operable lifters 76 are biased by the bottom member 108 and slidably move along the plate 120 to perform the lateral operation 118.

As exemplified in FIGS. 8 and 9, the mold 52 is operable from the molding position 112, wherein the top member 106 engages the bottom member 108 to form the molding cavity 110. Additionally, the molding position 112 is defined by the at least one lifter 76, and typically a plurality of lifters 76 that are set in a retracted position 130. The mold 52 is then operable to a release position 132 where the top member 106 moves away from the bottom member 108. The mold 52 is further configured to be moved to a removal position 134 where the at least one lifter 76 operates from the retracted position 130 to an extended position 136. Operation of the at least one lifter 76 between the retracted position 130 and the extended position 136 defines a slidable operation of the various lifters 76 through a lifter slot 138 defined within the bottom member 108. The lifters 76 are typically positioned within the bottom member 108 at a lifter angle 140 such that vertical operation 116 of the lifters 76 also corresponds to lateral operation 118 of a head portion 142 of the lifter 76 as the lifter 76 moves from the retracted position 130 to the extended position 136. Operation of the at least one lifter 76 between the retracted and extended positions 130, 136 can also be accomplished by vertical displacement or other movement of the bottom member 108 of the mold 52. This movement of the mold 52 can serve to bias the at least one lifter 76 within the lifter slot 138 in a lateral direction as the lower member 58 operates vertically.

As exemplified in FIGS. 1-4 and 8-12, the top and bottom members 106, 108 of the mold 52 can be used to form relief and textures within the interior surface 30 of the bin 10. Because the bin 10 is formed in the planar position 32, the top member 106 of the mold 52 can define these textures as part of the molding cavity 110. After the bin 10 is formed in the mold 52, the top member 106 can be pulled away from the bin 10 in a direction perpendicular to the interior surface 30 of each of the bin walls 26. Again, during molding, the bin walls 26 are all in the planar configuration and co-planar with one another. In this manner, the relief and other texture can be molded into the bin 10 to have a substantially complete coverage of the interior surface 30. When the bin 10 is moved into the container position 34, this relief and texture translates to a complete pattern that extends through the entire interior surface 30 of the bin 10. This configuration of the top and bottom members 106, 108 of the mold 52 provides for the convenient flexibility to include a wide range of relief and textures. These relief and textures can include, but are not limited to, grains, patterns, images, indicia, imitation material finishes, combinations thereof and other textures.

These disclosed features of the bin 10 provide distinct advantages over the prior art container 300 discussed above. The prior art containers 300 are not able to be formed with texture covering the entire interior surface. Because of the configuration of the obliquely angled walls 302 for the prior art container 300, the prior art molds are not able to pull out of the prior art container 300 in a direction that could create the same relief or textures. The use of such textures in the prior art molds could prevent the upper and lower molds 306, 308 in the prior art device from moving apart from one another.

Referring again to FIGS. 8 and 9, the various lifters 76 of the mold 52 each typically include a head portion 142. This head portion 142 of the lifters 76, when in the retracted position 130, is disposed within a lifter recess 150 defined within the lower member 58. The extended position 136 is defined by the head portion 142 of the various lifters 76 extending from the lifter recess 150 at a predetermined lifter angle 140. Again, this predetermined lifter angle 140 allows for lateral operation 118 of the head portion 142 of the lifter 76 as the lifter 76 operates from the retracted position 130 to the extended position 136. When the head portion 142 of the lifter 76 is in the retracted position 130 and disposed within the lifter recess 150, a top surface 152 of the head portion 142 is typically co-planar with the outer surface 166 of the bin 10 in the planar position 32. Through this configuration of the mold 52, the operable components of the mold 52 typically include the upper member of the mold 52 and one or more lifters 76 that are operable through the lower member 58 between the retracted and extended positions 130, 136. Lateral operation 118 of the head portions 142 of the lifters 76 can also be performed by vertical movement of the bottom member 108 of the mold 52.

Within the bottom member 108, a leg 154 of the lifters 76 extend through the lifter slot 138 at the lifter angle 140. This lifter slot 138 directs the angular operation of the leg 154 and head portion 142 in at least the direction of lateral operation 118.

Referring again to FIGS. 8-13, according to the method 400, after the console bin 10 is formed within the mold 52 in the planar position 32, step 404 of the method 400 includes folding the bin walls 26 from the planar position 32, where the bin walls 26 are coplanar with the base 24, to a container position 34. In this container position 34, the bin walls 26 are oriented perpendicular to, and extend orthogonally from, the base 24. Once in this container position 34, the console bin 10 can then be attached to the console housing 20 (step 406).

Referring again to FIGS. 8 and 9, the various lifters 76 that are included within the mold 52 can include one or more lifter notches 160 as well as various lifter projections 162 that can be used to define connecting portions 164 within an outer surface 166 for the bin 10 for the console 12. As the lifters 76 manipulate between the retracted and extended positions 130, 136, the head portion 142 of each lifter 76 performs vertical operation 116 and also lateral operation 118. The lateral operation 118 of the head portion 142 of each lifter 76 serves to draw the lifter notches 160 and lifter projections 162 away from the connecting portions 164 of the bin 10 for the console 12. Once the lifters 76 are in the extended position 136, the bin 10 in the planar position 32 can be easily removed from the mold 52 and the mold 52 can be returned to the molding position 112. As discussed previously, the mold 52 can operate between the molding position 112 that allows for the injection of the formable material 114 into the mold 52 to form the bin 10 in the planar position 32. The mold 52 can then be moved to a release position 132 where the top member 106 moves away from the bottom member 108. In this release position 132, the lifters 76 are typically retained in the retracted position 130 and within the respective lifter recesses 150. The mold 52 is then operable to the removal position 134 where the one or more lifters 76 operate from the retracted position 130 to the extended position 136.

As exemplified in FIGS. 8 and 9, the components of the mold 52 used to form the bin 10 in the planar position 32 each operate in, generally, the same direction. The top member 106 of the mold 52 operates vertically and the lifters 76 also translate vertically. As discussed above, this vertical operation 116 of the lifters 76 also results in a contemporaneous lateral operation 118 of the head portion 142 of the lifters 76 with respect to the formed bin 10. This translation of components in generally the same direction decreases the complexity of the mold 52 and a cost associated with forming the bin 10 described herein.

Referring again to FIGS. 1-4 and 8-11, at least one of the lifters 76 is configured to form a clip member 90 defined within a connecting edge 70 of one of the bin walls 26 of the plurality of vertical bin walls 26 for the bin 10. The clip member 90, when formed and placed in the container position 34 is configured to selectively engage a latch 92 of a lid 94 for the console housing 20. This latch 92 for the lid 94 can engage with the clip member 90 to define a closed position 96 of the lid 94. This clip member 90, as discussed above, can be formed using one or more lifters 76 that include a head portion 142 having various structural formations that can be used in the molding position 112 to allow formation of the clip member 90 while the bin 10 is in the planar position 32.

Referring again to FIGS. 1-4 and 8-12, the vehicle 14 can include the center console 12 that is disposed within the passenger cabin. The bin 10 is disposed within the console 12, where the bin 10 includes a plurality of bin walls 26 that are coupled to the base 24 at the respective living hinges 28. Each bin wall 26 of the plurality of bin walls 26 is selectively operable from the planar position 32, which is coplanar with the base 24, and to a container position 34 where the bin walls 26 are perpendicular to and extend orthogonally from the base 24. In the container position 34, the various bin walls 26 define a vertical interior surface 30 of the bin 10 that extends orthogonally from the upper surface 170 of the base 24. As discussed above, the bin 10 is typically an injection molded member that is molded to include the respective living hinges 28 and the plurality of bin walls 26 in the planar position 32. The planar position 32 is defined by the various bin walls 26 and the base 24 of the bin 10 being in a coplanar configuration. From this coplanar configuration defined by the planar position 32, the bin walls 26 can be rotated upward at the respective living hinges 28 to define the container position 34. The plurality of bin walls 26 in a container position 34 include connecting edges 70 that connect to an upper perimeter 72 of the console 12. These upper connecting edges 70 of the bin 10 serve to secure the bin 10 within the housing 20 for the console 12 and also form the various attachment features 188 such as the clip member 90 and other securing features that allow for engagement between the bin 10 and the housing 20 for the console 12.

According to various aspects of the device, the bin 10 described herein can be formed into the planar position 32 and then manipulated after manufacturing into the container position 34. These bins 10 can be utilized within various storage areas within the vehicle 14. Such storage areas can include, but are not limited to, consoles 12, glove boxes, rear consoles 12, side panels of passenger compartments, vehicle armrests, and other similar storage locations within a vehicle 14.

Figure 10:
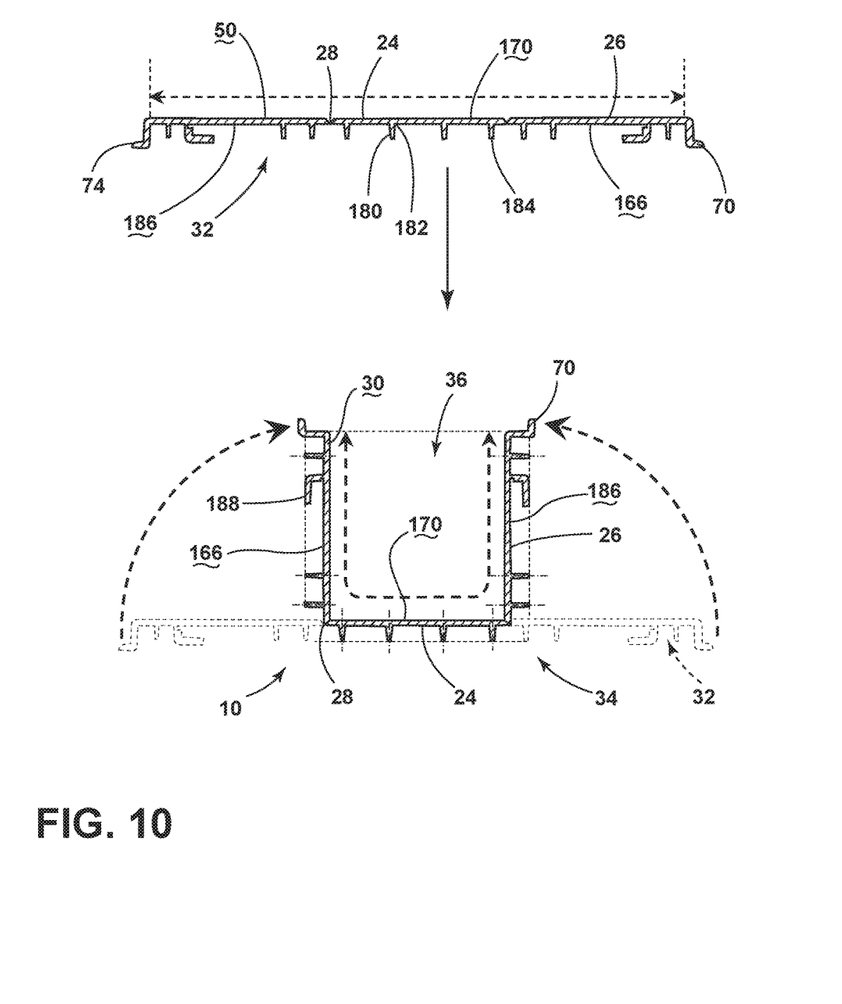
FIG. 10 is a cross-sectional view of the console bin of FIG. 3, taken along line X-X and showing the process of folding the plurality of walls from the planar position to the container position.
Figure 11:
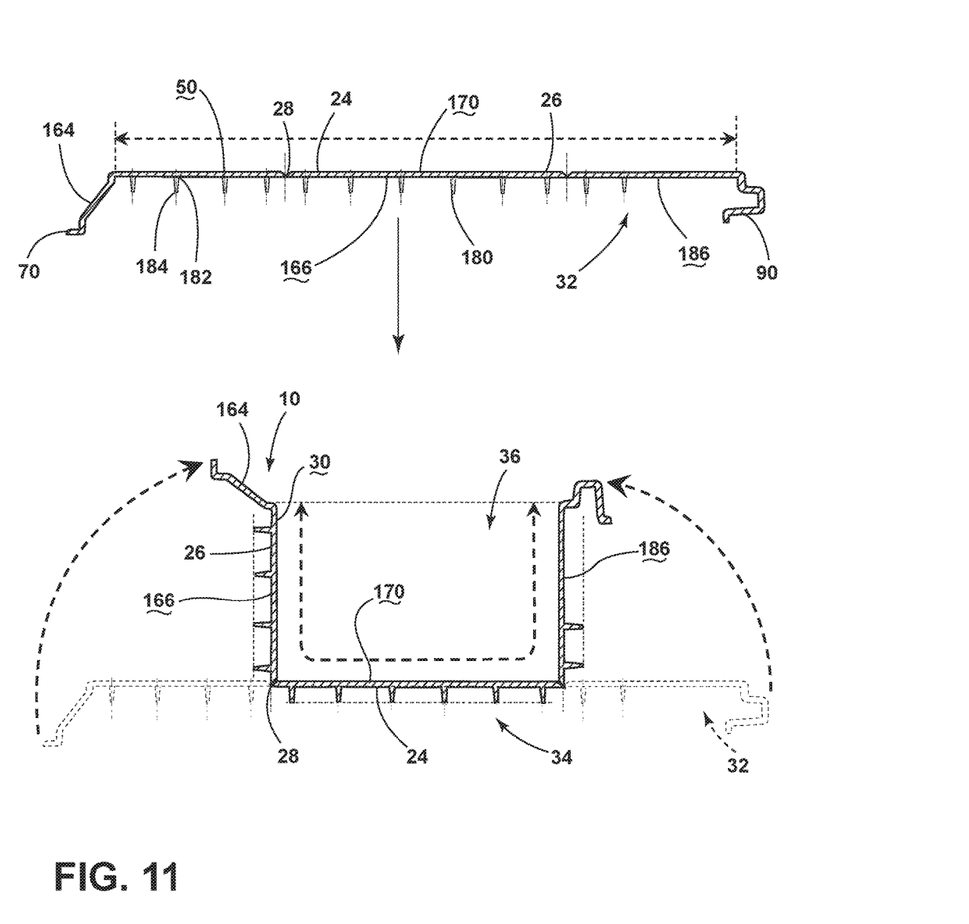
FIG. 11 is a cross-sectional view of the console bin of FIG. 3 taken along line XI-XI and showing a process for folding the console bin from the planar position into the container position.
Figure 12:
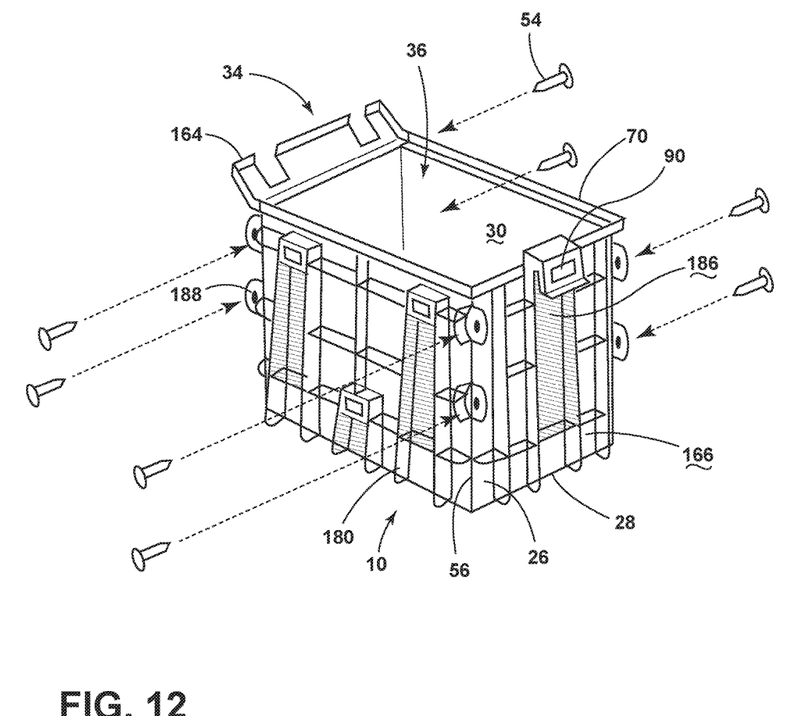
FIG. 12 is a partially exploded perspective view of an aspect of the console bin and showing attachment of the vertical sides of the console bin in the container position.
Figure 13:
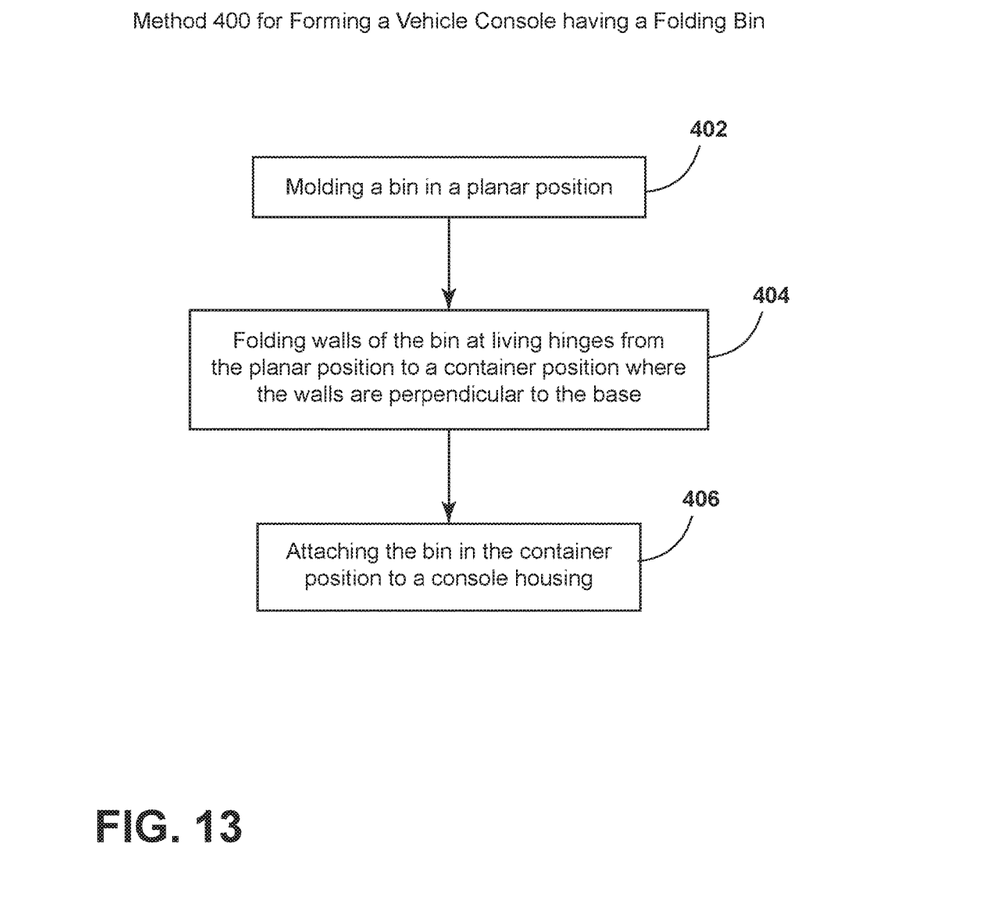
FIG. 13 is a linear flow diagram illustrating a method for forming a console bin for a vehicle console.

Referring now to FIGS. 10-12, the console bin 10 can include various reinforcing ribs 180 that are defined within an outer surface 166 of the bin 10. These reinforcing ribs 180 can be defined within the top and/or bottom members 106, 108 of the mold 52. These ribs 180 are formed such that operation of the lifters 76 allow for easy removal of these ribs 180 of the console bin 10 from the mold 52 in the planar position 32. According to various aspects of the device, the ribs 180 can include a generally tapered configuration where the rib base 182 of the rib 180 has a wider thickness than the end 184 of each rib 180. This tapered configuration can allow for easy removal of the bin 10, while in the planar position 32, from the bottom member 108 of the mold 52 as the lifters 76 are moved from the retracted position 130 to the extended position 136. As the lifter 76 is moved from the retracted position 130 to the extended position 136, the outer surface 166 of the bin 10 can be oriented to allow for movement of the lifters 76 between the ribs 180. In this manner, the ribs 180 can be positioned to include a sliding surface 186 that is generally free of reinforcing ribs 180 or is positioned between various reinforcing ribs 180. This sliding surface 186 allows for the lateral operation 118 of the head portion 142 of each lifter 76 to operate along the outer surface 166 of the bin 10. The sliding surface 186 also allows for the contemporaneous vertical operation 116 of the head portion 142 of the lifters 76 from the retracted position 130 to the extended position 136.

According to various aspects of the device, each lifter 76 can typically include its own dedicated sliding surface 186 within which the head portion 142 of the respective lifter 76 can operate between the retracted position 130 and the extended position 136. This sliding surface 186 also allows for the head portion 142 to slide along the outer surface 166 of the bin 10 so that the bin 10 can translate upward from the bottom member 108 of the mold 52 to be removed from the mold 52 in a convenient fashion. The reinforcing ribs 180 can also include attachment features 188 that allow for fasteners 54 to be disposed within various portions of the bin 10 to retain the bin 10 within the container position 34. These fasteners 54 can also be used to attach the bin 10 to the housing 20 for the console 12.

Referring again to FIG. 12, the sliding surface 186 defined within the outer surface 166 of each bin 10 can be bound by one or more reinforcing ribs 180. Where this sliding surface 186 is bound by the reinforcing ribs 180, movement of the bin 10 in the planar position 32 can be controlled during translation of the various lifters 76 between the retracted and extended positions 130, 136.

Referring again to the prior art configuration exemplified in FIGS. 5-7, conventional containers 300 for consoles 12 within vehicles 14 are typically not formed with outer ribs 180 without the use of additional tooling that moves in a direction generally perpendicular to the primary tool. Again, these formations can cause added complexity and cost to the formation of each container 300. These laterally sliding elements 316 are typically contained within each of the upper and lower molds 306, 308 within the conventional mechanism for creating the conventional prior art containers 300. Again, the addition of these laterally sliding elements 316 within the various components adds complexity and cost to the overall manufacture of components for the prior art container 300.

Referring again to the various aspects of the device as exemplified in FIGS. 1-4 and 8-12, the use of the bin 10 that is formed in the planar position 32 and having the bin walls 26 attached to the base 24 of the living hinges 28 provides for decreased complexity in tooling and also results in a greater inner volume 36 of the bin 10. Because the bin walls 26 are vertically oriented and extend orthogonally from the base 24, the interior of the bin 10 has a substantially consistent width 38 top to bottom that maximizes the volume within the bin 10. Additionally, the use of the folding bin walls 26 at the living hinges 28, commonly referred to as a "dog house" configuration, can also save space when parts are stored to be used during manufacture, assembly, or after-market sale. By storing these components in a planar position 32, the overall height 40 of the item is greatly diminished when the bin walls 26 are folded into the planar position 32. Packaging costs may also be saved as these bins 10 in the planar position 32 can be shipped with relatively small packaging in relation to the fully formed prior art containers 300 exemplified in FIGS. 5-7.

Referring again to FIGS. 8-12, because the bin walls 26 are formed in the planar position 32 and are coplanar with the base 24, all, or substantially all, of the attachment features 188 for the bin 10 are located in the direction of the bottom member 108 of the mold 52. Accordingly, the various lifters 76 can each be included, typically, within the bottom member 108 of the mold 52 such that the various lifters 76 are only contained within this bottom member 108. The top member 106 can then be formed as a solid member that can be manipulated vertically relative to the bottom member 108. In this configuration, the only moving components within the mold 52 for the bin 10 formed in the planar position 32 are the top member 106 and the various lifters 76 slidably operating within the bottom member 108.

According to various aspects of the device, the formable material 114 that is injection molded into the mold 52 in the molding position 112 can include any one of various materials. Such materials can include, but are not limited to, plastics, injectable metals, composite materials, and other similar formable materials 114. It is also contemplated that various fastening mechanisms and fixtures can be placed within the mold 52 such that the formable material 114 can be injection molded around these components for integrally forming the components within the bin 10 in the planar position 32. Such components can include, but are not limited to, fasteners 54, hooks, attachment points for various other fixtures (such as USB ports, electrical ports, data ports, or other similar connectivity), combinations thereof and other similar components.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle console comprising:
a housing having an interior volume; and
a console bin disposed within the interior volume, the console bin being an injection molded member having a base and a plurality of bin walls coupled to the base at living hinges, wherein the plurality of bin walls form an interior surface that extends orthogonally from the base, wherein outer edges of the plurality of bin walls includes connecting edges that connect to an upper perimeter of the housing, and wherein at least one of the connecting edges includes a clip member that forms an interference engagement with the housing.

2. The vehicle console of claim 1, wherein the plurality of bin walls are rotationally operable relative to the base from a planar position defined by the plurality of bin walls being co-planar with the base, to a container position defined by the plurality of bin walls being rotated upward to a position orthogonal to the base.

3. The vehicle console of claim 2, wherein the plurality of bin walls are retained in the container position by fasteners installed at vertical seams defined between the plurality of bin walls.

4. The vehicle console of claim 2, wherein the console bin is molded in the planar position.

5. The vehicle console of claim 1, wherein the base is secured to a lower member of the housing via fasteners.

6. The vehicle console of claim 1, further comprising:
a lid that selectively encloses the interior volume; and
a clip member formed within one of the connecting edges of the plurality of bin walls, wherein the clip member selectively engages a latch of the lid to define a closed position of the lid.

* * * * *